United States Patent [19]

Fritts

[11] 4,179,799

[45] Dec. 25, 1979

[54] METHOD OF MOLDING A DOUBLE CATHODE HAVING A SENSING GRID FOR A POROUS ELECTRODE PRIMARY BATTERY

[75] Inventor: David H. Fritts, Dayton, Ohio

[73] Assignee: The United States of America as represented by the Secretary of the Air Force, Washington, D.C.

[21] Appl. No.: 896,863

[22] Filed: Apr. 17, 1978

Related U.S. Application Data

[62] Division of Ser. No. 844,162, Oct. 21, 1977, Pat. No. 4,126,735.

[51] Int. Cl.² .................................................. H01M 4/08
[52] U.S. Cl. ........................................ 29/623.5; 264/105; 429/91
[58] Field of Search .......................... 29/623.1, 623.5; 264/104, 105; 429/93, 91, 92, 233, 178, 218

[56] References Cited

U.S. PATENT DOCUMENTS

| 2,988,590 | 6/1961 | Andre | 429/93 |
| 3,206,335 | 9/1965 | Sundberg | 429/93 |
| 3,720,869 | 3/1973 | Rowlette | 429/93 |
| 3,901,960 | 8/1975 | Holloway et al. | 264/104 |
| 3,944,434 | 3/1976 | Gröppel et al. | 29/623.5 |
| 4,020,243 | 4/1977 | Oldford | 429/93 |

Primary Examiner—Daniel C. Crane
Attorney, Agent, or Firm—Joseph E. Rusz; Robert Kern Duncan

[57] ABSTRACT

In a porous electrode primary battery a sensing grid is positioned in a cell on or near the surface of the porous cathode facing the separator and anode. The voltage measured between this sensing grid and the conventional cathode current collector grid is a function of the current distribution within the electrode which is continuously changing as the battery discharges, thus the measured voltage is indicative of the state of charge of the particular cell having the sensing grid and for a battery containing cooperatively connected cells, the state of the battery in general.

1 Claim, 10 Drawing Figures

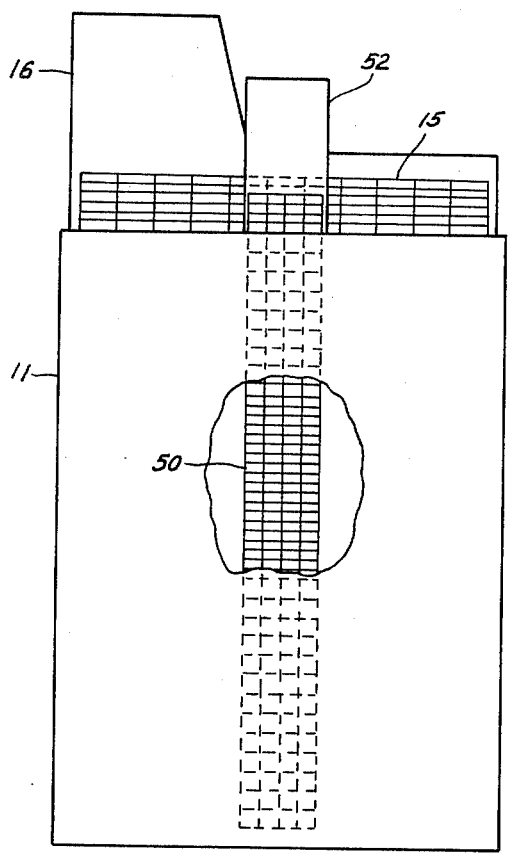
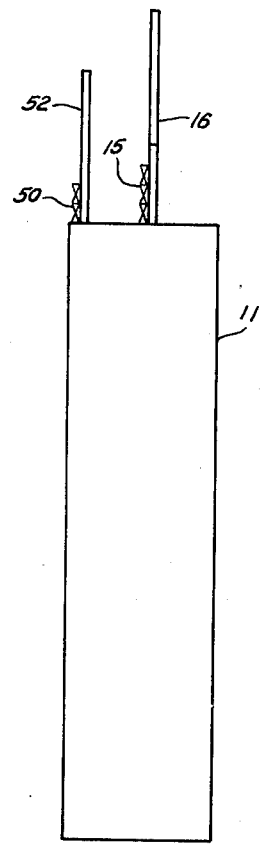
Fig. 4
Fig. 5
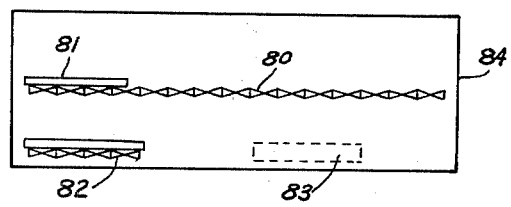
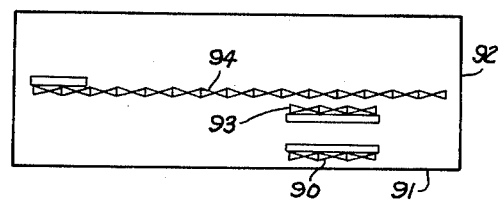
Fig. 7
Fig. 8

METHOD OF MOLDING A DOUBLE CATHODE HAVING A SENSING GRID FOR A POROUS ELECTRODE PRIMARY BATTERY

RIGHTS OF THE GOVERNMENT

The invention described herein may be manufactured or used by or for the Government of the United States for all governmental purposes without the payment of any royalty.

This is a division of application Ser. No. 844,162, filed Oct. 21, 1977 now U.S. Pat. No. 4,126,735.

BACKGROUND OF THE INVENTION

The field of the invention is in the primary battery art, and more particularly in the art of porous electrode primary batteries.

In the absence of good history records, it has been quite difficult to determine the present condition of a primary battery with respect to its remaining useful life. Generally, the voltage and current characteristics of a battery with, for example, half its useful life used up are substantially the same as a new battery. With secondary batteries, which can be recharged, the necessity of knowing their state of charge is generally not so important as they can be readily recharged to substantially a known energy content.

The best known prior art is that of U.S. Pat. No. 2,988,590 to patentee H. G. Andre, and U.S. Pat. No. 3,720,869 to patentee Rowlette.

SUMMARY OF THE INVENTION

An improved primary battery structure is disclosed which provides means for making a simple voltage measurement by which the remaining useful life of the battery may be ascertained.

BRIEF DESCRIPTION OF THE DRAWING

FIG. 4 pictorially represents a side view of an improved cathode incorporating the structure of the invention;

FIG. 5 is a side view of the cathode illustrated in FIG. 4;

FIG. 7 is a top view illustrating an alternative location of the voltage sensing grid; and FIG. 8 is a top view illustrating another embodiment of the invention having a first and a second state of charge sensing grids.

DESCRIPTION OF THE PREFERRED EMBODIMENT

Generally, the term battery is used to designate a chemical source of electrical energy. It is composed of one or more cells arranged, connected, and cased with means for external electrical connection. A single cell, having terminals for exterior connection is frequently called a battery interchangeably with the term cell. Generally, the state of charge of any cell in a battery is representative of the battery as a whole. Thus, while this invention measures the state of charge of a single cell, with a sensing grid, it is applicable to the charge of the battery of which the cell is one of a group of cells. Obviously, if desired, more than one or even all the cells in a battery may be fabricated with a sensing grid or electrode.

Figure 1:
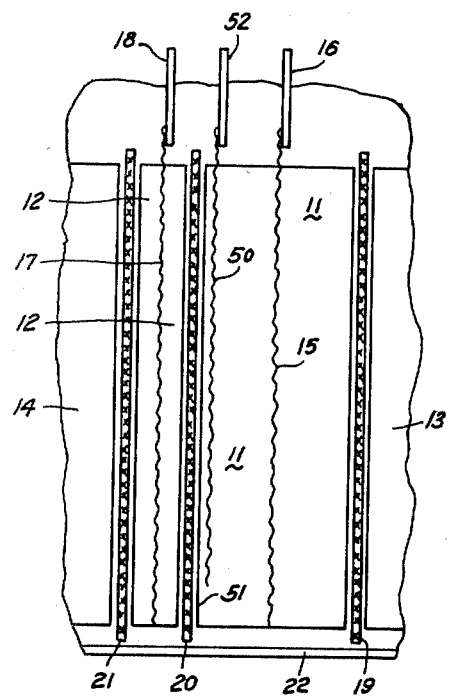
FIG. 1 is a schematic-pictorial representation of an improved cell illustrating the invention.

A typical embodiment of the invention as illustrated in FIG. 1 represents an improved Lithium Inorganic cell. Typically, several cells are fabricated into a battery, and typically each electrode serves both adjacent electrodes, i.e., porous carbon cathode 11 serves both lithium anodes 12 and 13, and lithium anode 12 serves cathodes 11 and 14. An individual cell can be considered extending from the collecting grid of one electrode to the collecting grid of an adjacent opposite polarity electrode, (with generally a separator in between). With this conventional type of structure the current collecting grids for the electrodes are positioned in the center of the electrodes. Thus, grid 15 with connecting tab 16 is centrally located in the double cathode 11, and anode grid 17 with connecting tab 18 is centrally located in double anode 12. Nickel is the conventional material from which to fabricate the collecting grids. Conventional glass mat separators 19, 20, and 21 isolate the electrodes and position them in cell case 22. Lithium inorganic cells and their fabrication are well known in the art. (For single cell batteries, in flat cell construction the collecting grids are positioned in their respective electrodes at the surfaces of the electrodes opposite the common separator. In round cell construction, the connector for the center electrode is in the center of the cell and the connector for the concentric outer electrode is at the outer periphery of the cell.)

Figure 2:
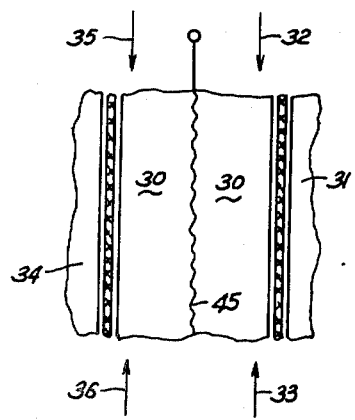
FIG. 2 schematically illustrates the effective active area in the cathode of a new cell.
Figure 2A:
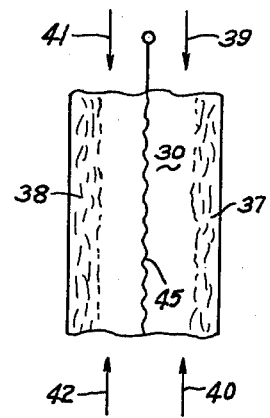
FIG. 2a schematically illustrates the cathode of FIG. 2 after approximately half of the useful life of the cell is used.
Figure 2B:
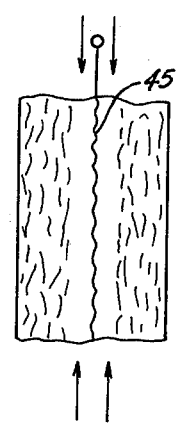
FIG. 2b schematically illustrates the cathode of FIG. 2 after approximately three-fourths of the useful life of the cell has been used.

In the operation of porous electrode primary batteries, as the cell discharges the apparent source of the current in the cathode moves sequentially from the cathode surface next to the separator (adjacent the anode) in toward the cathode current collector grid. This is due to the salting out of insoluble discharge products which occurs initially near the face of the cathode facing the anode and continues until that area is blocked. The apparent current source moves just ahead of the blocked area and both the source and the blocking proceed toward the cathode current collector grid until the complete cathode becomes blocked or the anode active material is exhausted or the catholyte is exhausted and the cell ceases to function. This blocking action on the cathode is schematically diagrammed in FIGS. 2, 2a, and 2b. In FIG. 2, a new battery, the apparent source of the current in the cathode between the cathode 30 and anode 31 is adjacent the cathode surface indicated between the arrows 32 and 33, for the right hand cell. For the left hand cell the apparent current source from cathode 30 to anode 34 is between arrows 35 and 36. After the battery has been used for a period of time the cathode 30, as illustrated in FIG. 2a, becomes progressively blocked, 37 and 38, inward from its outer surfaces and the apparent sources of the currents move inward ahead of the blocked region to the regions indicated between the arrows 39-40 and 41-42. With further use of the battery the blocking and current sources move on toward the collecting grid 45 as illustrated in FIG. 2b.

Figure 3:
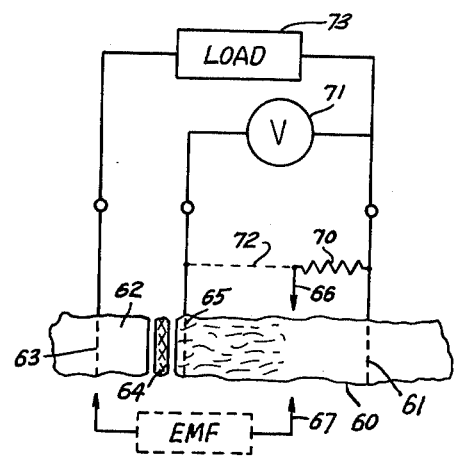
FIG. 3 schematically illustrates the current distribution and voltage measurement in a cell having approximately half its useful life used.

I have found that the foregoing action is generally true of all porous electrode primary batteries. I have also found that by placing a sensing grid in a porous cathode near the surface next to a separator that separates the cathode from an anode that the extent of this blocking may be determined by the determining the location of the apparent source of current in the cathode. This apparent source of current is directly related to the remaining life of the battery. My invention comprises forming a sensing grid 50 in cathode 11 as illustrated in FIG. 1. The sensing grid 50 is positioned in the cathode 11 near the surface of the cathode 51 adjacent the separator 20. Thus, the actual cathode for this cell is substantially bounded by the sensing grid on the interior side of the cathode and the collection grid at the other, or opposite, side of the individual cell cathode. A conventional electrical connection tab 52 is attached to the grid 50. As energy is taken from the battery in the form of an exterior current flow between connections 16 and 18 an internal current flow takes place within the cell of the battery from the apparent source location in the cathode, across separator 20, to the anode. This is schematically diagrammed for partially discharged ("used-up") cell in FIG. 3. The cathode 60 has collecting grid 61 and the anode 62 has collecting grid 63. Separator 64 separates the anode and cathode. The sensing grid 65 is located in the cathode as previously described. This particular cell illustrated is partially salted and blocked so that the apparent current source in the cathode 60 is between the arrows 66 and 67. I have found that there is a small but easily measured voltage drop across the cathode between the apparent source of current and the conventional cathode current collecting grid. Thus, in FIG. 3 the current flow in the cathode 60 is from the apparent source 66-67 through the remaining substantially inactive cathode region, between the source and the collecting grid 61. This is represented by resistance 70. The "used-up" portion of the cathode between the source 66-67 and the surface next to the separator 64 is inactive in the generation of current and hence substantially no cell output current flow is present in this part of the cathode and no voltage drop occurs in this region. (Current does flow between 66-67 and the anode 62 through the electrolyte and separator, however.) Thus, a voltmeter 71 connected between the conventional cathode current collecting grid 61 and the sensing grid 65 will read a maximum voltage drop, i.e., across the total cathode of a cell for a new cell and a minimum of substantially zero volts for a substantially fully discharged cell (that is cathode limited), with appropriate in between values of voltage representing the useful life remaining in the cell. In cells that are designed to be limited other than by cathode blockage, the end of the cell life will occur at a determined voltage above zero. For instance, in a particular cell that is designed to be anode limited, that is, all the active anode material will be used up before the cathode becomes completely blocked, the range of sensing voltage is from 50 $\mu$V for a fully charged (new) cell to approximately 10 $\mu$V, at which time the anode is on the verge of being substantially all used up. Ideally for a perfect cell, it would quit all over at the same time, i.e., the cathode becomes completely blocked just as the last bit of active anode material and catholyte material is exhausted. However, due to the hazard involved with raw lithium, cells containing lithium are quite often designed such that the lithium becomes exhausted (making the cell inoperative) just before other limiting action would occur. Ideally, for precision work, a calibration curve will be made for each design of battery manufactured. By reading the sensing voltage of a cell when the battery is under a predetermined load, and referring to the curve for that type battery with that load, the remaining life may be read from the curve. (This information may be printed on the side of the battery for convenience.) For many applications, where only an approximation of the remaining life of the battery is desired, the percent of the indicated voltage sensed is of the sensed voltage for a new cell is a sufficiently accurate figure. (With the battery under a predetermined load when making the voltage measurements, of course.) In FIG. 3 with approximately half the life of the cell used, to the voltmeter 71 its as though a short 72 over this used portion had occurred. In typical embodiments of the invention as described comprising conventional lithium inorganic cell elements such as having a lithium anode, $LiAlCl_4$ electrolyte with $SOCl_2$ depolarizer, and a porous carbon cathode approximately one-half inch in thickness, the voltage drop across the cathode is approximately 50 $\mu$V at 0% depth of discharge (new battery) for current densities in the cell of 2 milliamps per square centimeter delivered to load 73. Since the cell configuration in these embodiments is flat, the remaining cell life is substantially directly proportional to the measured voltage between the sensing grid and the current collecting grid between the range of 50 $\mu$V for full charge to approaching zero volts for a discharged battery for the stated predetermined discharge rate. For other cell configurations, such as round, various well known factors of proportionally would exist between the measured voltage and the remaining cell life.

Generally, the voltage pickup (sensing) grid is fabricated as an integral part of the porous carbon cathode in a manner similar to that conventionally used for a conventional carbon cathode current collection grid. The voltage pickup grid can be made substantially smaller in all dimensions than the current collecting grid. Substantially no current flows from the sensing pickup grid, except the minute amount to actuate the measuring voltmeter. Ideally, the voltmeter should draw substantially no current. Generally, conventional, sensitive, high input impedance (such as FET) voltmeters are suitable for measurement purposes.

Figure 6:
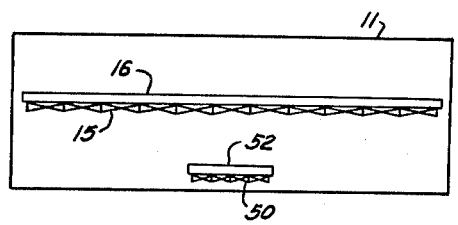
FIG. 6 is a top view of the cathode illustrated in FIG. 4.

FIGS. 4, 5, and 6 show respectively detailed pictorial front, side, and top views of a typical cathode as schematically diagrammed at 11 in FIG. 1. It is a conventional double cathode, i.e., it serves two cells, a right hand cell and a left hand cell. Conventional lamination techniques are used, with the thickness of the layers depending on grid placement, to fabricate the novel cathode containing the sensing charge determination grid. For example, a conventional mold for a conventional porous cathode may be used and a carbon slurry placed in the mold in successive layers. Ideally, the state of charge sensing grid should be as close to the cathode surface as feasible, therefore the first slurry layer should be relatively thin, not over approximately 5% of the total cathode thickness (for two cells). Then the sensing grid is placed in the mold and the second layer of carbon slurry is poured to the mid plane of the total cathode for placement of the current collection grid. The collection grid is positioned and the third layer of slurry then completes the cathode. The cathode is then cured in the conventional manner. Generally, any fabrication technique used for conventionally placing the cathode current collecting grid in the cathode may also be used to place the state of charge sensing grid in the cathode.

It has been found that for conventional size cells and batteries that a 25 mesh nickel screen sensing grid made from 0.005 inch wire and rolled to a thickness of approximately 0.005 inches, has sufficient rigidity for handling ease and an adequately open structure so as to have no discernible effect on the conventional performance of the battery cell. Thicker electrodes can, in general, use a screen with a larger wire size and a more open mesh. The size and structure of the sensing grid is not critical. It is generally made much smaller than the current collector grid. The actual geometry used in fabricating the sensing grid depends primarily on the uniformity of the current distribution in the cell cathode. Generally, in the ideal situation with perfectly uniform current density the size of the sensing grid is based primarily on handling and fabrication considerations. Theoretically, the sensing grid in the ideal situation could be a single fine wire since appreciably no current is carried by it.

If the conventional current collecting grid, of a particular battery construction to which it is desired to add this improvement, has a large value of resistance such that the internal voltage drop within the grid is comparable to that of the drop within the cathode then it is desirable that the sensing voltage measurement be made from a point on the current collector where substantially no voltage drop exists, for example, a point opposite the location where the connection tab is attached to the grid. Referring to FIG. 7, if the grid 80 in cathode 84 has a relatively high internal resistance to current flowing to connection tab 81 then it is desirable to position the sensing grid 82 opposite the tab location rather than at a position such as 83 in which the resistance of grid 80 would affect the voltage measurement.

In some embodiments of the invention with a particular cell structure it may be desirable not to utilize the conventional cell current collecting grid in sensing the state of charge of the cell, but to place two state of charge sensing grids in the cell as illustrated in FIG. 8. The two sensing grids are of similar construction, as previously described, one grid 90 is placed near an anode edge 91 of the cathode 92, as in previous embodiments, and the other sensing grid 93 is positioned near the conventional current collecting grid 94 in a position opposite the first sensing grid. The voltage measured between the two sensing grids, with a given current flow in the cell, is then a function of the current distribution within the cathode which is indicative both of the extent of discharge of the cell, and the extent of remaining life in the cell.

In some relatively recent, but well known, designs of porous electrode primary cells, a separate element as a physical separator between the cathode and anode is not necessary nor used. In these structures the cathode and anode materials are adjoining in physical contact. The charge sensing grid disclosed herein operates equally well in this type structure when it is positioned just below the surface of the cathode that adjoins the anode, as in the previously described embodiments.

I claim:

1. The method of molding a double cathode having a sensing grid for a porous electrode primary battery comprising:
   a. placing a relatively thin first carbon slurry in a mold;
   b. placing a charge sensing grid on the said first carbon slurry;
   c. placing a second carbon slurry in the mold over the said sensing grid;
   d. placing a current collecting grid on the said second slurry;
   e. placing a third slurry over the said current collecting grid forming the said double cathode; and
   f. curing the said double cathode.

* * * * *